United States Patent [19]

Rath et al.

[11] Patent Number: 5,556,932
[45] Date of Patent: Sep. 17, 1996

[54] CHLORINE-FREE, NON-DRYING ISOBUTENE/DIENE COPOLYMERS AND PROCESS FOR THEIR PREPARATION

[75] Inventors: Hans P. Rath, Gruenstadt; Konrad Knoll, Mannheim; Helmut Mach, Heidelberg, all of Germany

[73] Assignee: BASF Aktiengesellschaft, Ludwigshafen, Germany

[21] Appl. No.: 505,258

[22] PCT Filed: Feb. 25, 1994

[86] PCT No.: PCT/EP94/00532

§ 371 Date: Aug. 7, 1995

§ 102(e) Date: Aug. 7, 1995

[87] PCT Pub. No.: WO94/20554

PCT Pub. Date: Sep. 15, 1994

[30] Foreign Application Priority Data

Mar. 2, 1993 [DE] Germany ............... 43 06 384.5

[51] Int. Cl.$^6$ ............... C08F 4/14; C08F 210/12
[52] U.S. Cl. ............... 526/339; 526/212; 526/237; 526/336; 526/308; 526/290; 585/508; 585/525; 585/507
[58] Field of Search ............... 526/212, 237, 526/336, 339, 290, 308; 585/507, 508, 525

[56] References Cited

U.S. PATENT DOCUMENTS

| | | | |
|---|---|---|---|
| 2,371,849 | 3/1945 | Schulze et al. | 526/237 |
| 2,780,664 | 2/1957 | Serniuk | 585/525 X |
| 4,152,499 | 5/1979 | Boerzel et al. | 526/237 X |
| 4,899,013 | 2/1990 | Lane | 585/507 X |
| 5,191,044 | 3/1993 | Rath et al. | 526/237 X |
| 5,408,018 | 4/1995 | Rath | 526/237 |

FOREIGN PATENT DOCUMENTS 2211854  7/1989  United Kingdom ............... 526/237

*Primary Examiner*—Fred Teskin
*Attorney, Agent, or Firm*—John H. Shurtleff

[57] ABSTRACT

Chlorine-free, non-drying copolymer of isobutene with $C_4$–$C_{10}$-dienes having isolated or conjugated double bonds and containing at least 60 mol % of terminal double bonds, and a process for their preparation.

9 Claims, No Drawings

CHLORINE-FREE, NON-DRYING ISOBUTENE/DIENE COPOLYMERS AND PROCESS FOR THEIR PREPARATION

The present invention relates to chlorine-free, non-drying copolymers of isobutene with $C_4$–$C_{10}$-dienes having isolated or conjugated double bonds, containing at least 60 mol % of terminal double bonds and having a molecular weight $M_n$ of from 500 to 5,000 Dalton, and a process for their preparation.

Copolymers of dienes and isobutene are used for the preparation of fuel and lubricating oil additives, as described in GB-A 2 231 873. A molecular weight of these copolymers of from 500 to 5,000 Dalton and in particular a high content of terminal double bonds of more than 50, preferably more than 60, mol % are essential for ensuring that diene/isobutene copolymers can be used economically for the stated purpose. The terminal double bonds are required in order to permit the copolymer to be converted by reaction with, for example, maleic anhydride into the maleic acid/copolymer adduct, which is then reacted with amines to give fuel and lubricating oil additives according to GB-A 2 231 873.

Although copolymers of, for example, 1,3-butadiene or isoprene with isobutene are mentioned in GB-A 2 231 873 as starting materials for the preparation of the relevant additives, diene/isobutene copolymers have to date been unimportant for this purpose since it has not been possible so far to prepare diene/isobutene copolymers meeting the stated requirements with respect to the molecular weight and the content of terminal double bonds.

A survey of the preparation of isobutene/diene copolymers is given in H. Güterbock, Polyisobutylen und Isobutylen-Mischpolymerisate, pages 122 to 127, Springer Berlin 1958.

U.S. Pat. No. 2,818,460 describes the preparation of drying oils by the copolymerization of isobutene with 1,3-butadiene, anhydrous hydrogen fluoride in an N,N-dialkylamide solvent being used as a catalyst. U.S. Pat No. 2 780 664 likewise relates to the preparation of drying oils by copolymerization of 1,3-butadiene with isobutene, boron trifluoride etherares in an alkyl halide solvent being used as catalysts. If a 1:1 boron trifluoride/methanol complex is used as the catalyst, gel-like or resinous copolymers are formed.

Only highly polymeric isobutene/butadiene or isoprene copolymers, referred to generally as butyl rubber, have become industrially important to date and are prepared with the aid of aluminum chloride as the catalyst. However, in the presence of the aluminum chloride catalyst and in the presence of halogenated, in particular chlorinated, solvents, halogenated copolymers may be formed. The formation of high molecular weight isobutene/diene copolymers as well as the formation of halogenated isobutene/diene copolymers are however undesirable when said copolymers are used for the preparation of fuel additives, on the one hand owing to the low solubility of the high molecular weight copolymers and on the other hand halogenated dioxin derivatives may be released with the exhaust gas in the combustion of halogen-containing fuel additives, the formation and release of which derivatives are to be avoided for ecological and toxicological reasons.

In U.S. Pat. No. 2 578 214, non-drying oils are produced by copolymerization of isobutene with 1,3-butadiene, aluminum chloride being used as the catalyst. Boron trifluoride is likewise proposed as a catalyst. In this process, however, the major part of the terminal double bond is isomerized to internal double bonds owing to the very reactive catalysts used therein, so that the copolymer obtained by this process is likewise unsuitable as a starting material for the preparation of the stated fuel additives.

The difficulties in the preparation of isobutene/diene copolymers having a high content of terminal double bonds, also referred to herein as highly reactive isobutene/diene copolymers, are essentially due to the fact that the Lewis or Brenstedt acid polymerization catalyst itself catalyses the isomerization of the terminal double bonds to double bonds situated in the interior of the macromolecule, via the intermediate formation of cationic centers in the macromolecule. However, the double bonds situated in the interior of the macromolecule have little or no reactivity toward unsaturated anhydrides, such as maleic anhydride, and such copolymers having a low content of double bonds are therefore unsuitable for the preparation of the desired fuel and lubricant additives.

Owing to the formation of such cationic centers, crosslinking of various macromolecules occurs as further secondary reaction, leading to the formation of highly polymeric aggregates.

It is an object of the present invention to provide chlorine-free, non-drying low molecular weight isobutene/diene copolymers having a molecular weight $M_n$ of from 500 to 5,000 Dalton and a high content of terminal double bonds. It is a further object of the invention to provide a process for the preparation of these isobutene/diene copolymers.

We have found that this object is achieved by chlorine-free, non-drying copolymers of isobutene with $C_4$–$C_{10}$-dienes having isolated or conjugated double bonds, containing at least 60 mol % of terminal double bonds and having a molecular weight $M_n$ of from 500 to 5,000 Dalton.

We have also found a process for the preparation of chlorine-free, non-drying copolymers of one $C_4$–$C_{10}$-diene or various $C_4$–$C_{10}$-dienes having conjugated or isolated double bonds and isobutene, whose average molecular weight $M_n$ is from 500 to 5,000 Dalton and which contain at least 60 mol % of terminal double bonds, by cationic polymerization, wherein the isobutene is polymerized with the diene in a molar isobutene/diene ratio of from 50:1 to 0.4:1 with the aid of a boron trifluoride/$C_1$–$C_{15}$-alcohol complex whose molar boron trifluoride/alcohol ratio is from 0.25 to 0.9, in the presence or absence of hydrogen fluoride at from $-60°$ to $0°$ C.

The content of terminal double bonds in the isobutene/diene copolymers prepared according to the invention is determined with the aid of $^{13}$C-NMR spectroscopy. The terminal double bonds are double bonds whose carbon atoms can be identified in $^{13}$C-NMR spectrum by their signals at the chemical shift of 114.41 and 143.56 ppm, based on the standard tetramethylsilane. The content of terminal double bonds in the copolymer is determined by determining the peak areas of the signals in relation to the average molecular weight $M_n$ of the copolymer.

In this application, the average molecular weight is the number average molecular weight $M_n$, which can be determined, for example, with the aid of gel permeation chromatography or vapor pressure osmometry.

The novel process permits the preparation of polyisobutenes containing at least 60 mol % of terminal double bonds by cationic polymerization of isobutene with the relevant $C_4$–$C_{10}$-diene in the liquid phase at from $0°$ to $-60°$ C., preferably from $-2°$ to $-30°$ C., particularly preferably from $-5°$ to $-20°$ C., polymerization being effected with boron trifluoride in the presence of an alcohol and in the presence or absence of hydrogen fluoride.

In the novel process, boron trifluoride is used in a molar ratio of from 0.25 to 0.9, preferably from 0.4 to 0.8, based on the alcohol employed, is the alcohol is used in an excess relative to the boron trifluoride.

In the boron trifluoride/alcohol catalysts to be used according to the invention, the boron trifluoride is present not as discrete boron trifluoride molecules but as a boron trifluoride/alcohol complex. The exact structure of these boron trifluoride/alcohol complexes in the polymerization mixture is not known and is probably dependent on the molar ratio of the amounts of boron trifluoride and alcohol added to the polymerization mixture. There may be an equilibrium between the boron trifluoride/alcohol complex and the excess alcohol in the polymerization mixture.

Since the boron trifluoride is greatly modified in its properties as a polymerization catalyst by complex formation with the alcohol, this change in the catalyst properties is also directly influenced by the molar boron trifluoride/alcohol ratio and, since moreover this modification of the catalyst properties has a decisive effect on the quality of the isobutene/diene copolymer thus produced, in particular on its content of terminal double bonds, the alcohols as well as the hydrogen fluoride are also referred to below as cocatalysts.

For example, molar boron trifluoride/alcohol ratios of less than 0.5 give copolymers which contain many isobutene units and few diene units in the macromolecule. Higher molar boron trifluoride/alcohol ratios of from 0.5 to 0.9 result in increased incorporation of diene molecules in the polymer chain and increasing branching of said chain. In the case of molar boron trifluoride/alcohol ratios of one or more, the catalyst may cause undesirable isomerization of the terminal double bonds to give internal double bonds. The novel copolymers can also be obtained with molar boron trifluoride/alcohol ratios of 0.9 to 1.0, but precautions should be taken here to avoid the temporary occurrence of molar boron trifluoride/alcohol ratios of 1.0 or more.

The addition of anhydrous hydrogen fluoride to the novel boron trifluoride/alcohol catalyst system results in a further modification of its polymerization activity by virtue of the fact that diene molecules are incorporated in a larger amount in the copolymer. The hydrogen fluoride may be present in the catalyst system in a molar ratio of up to 0.5, preferably from 0.01 to 0.1, based on the boron.

The manner in which the hydrogen fluoride displays its action in the catalyst system used according to the invention is unexplained to date. It is possible that ternary boron trifluoride/alcohol/hydrogen fluoride complexes having a chemical structure unknown to date are formed, depending on the amount of hydrogen fluoride added.

For example, when conjugated dienes, such as 1,3-butadiene or isoprene are used, the result of the copolymerization can be determined via the composition of the catalyst system used according to the invention. It influences, for example, the extent to which isobutene and diene are incorporated in the copolymer at a given monomer concentration. Thus, alcohol/boron trifluoride/hydrogen fluoride catalyst systems in which these components are present, for example, in a molar ratio of from 2:1:0.5 to 1.5:1:0.5 result in the random incorporation of the monomers into the copolymer, ie. the monomer composition corresponds to the copolymer composition, whereas alcohol/boron trifluoride/hydrogen fluoride catalyst systems in which these components are present in a molar ratio of from 1.5:1:0.05 to 1.1:1:0.5 preferentially incorporate isobutene into the copolymer and the content of the diene components in the copolymers prepared in this manner is therefore lower than the diene content of the monomer mixture used.

The alcohols which may be employed in the catalyst system used according to the invention are primary and secondary $C_1$–$C_{15}$-alcohols, for example methanol, ethanol, n-propanol, isopropanol, n-butanol, 2-butanol, isobutanol and primary and secondary pentanols, hexanols, heptanols, octanols, nonanols, decanols, undecanols, dodecanols, tridecanols, tetradecanols and pentadecanols. The use of higher alcohols is also possible but, particularly because of their higher price, generally results in no additional economic advantages. $C_1$–$C_8$-Alcohol/boron trifluoride complexes are in general not completely soluble in the polymerization mixture, so that, when they are used as a catalyst, the polymerization takes place under heterogeneous catalysis, whereas when $C_9$–$C_{15}$-alcohol/boron trifluoride complexes are employed the higher lipophilicity of the alcohols used result in these complexes being homogeneously dissolved in the polymerization mixture and homogeneously catalyzing the polymerization. Primary and secondary $C_1$–$C_5$-alcohols are preferably used as cocatalysts in the novel process.

The catalysts which can be used according to the invention can be produced in situ in the polymerization mixture by metering in the catalyst components alcohol, boron trifluoride and, if required, hydrogen fluoride, but preformed boron trifluoride/alcohol or boron trifluoride/alcohol/hydrogen fluoride complexes produced in a separate apparatus may also advantageously be added as a catalyst to the polymerization mixture. If the catalyst complexes are produced in situ in the polymerization mixture, the alcohol is advantageously fed into the polymerization mixture simultaneously with the boron trifluoride and, if required, the hydrogen fluoride, primary and secondary $C_1$–$C_5$-alcohols being preferably used for the in situ production of the catalyst complex.

Gaseous boron trifluoride is advantageously used as a raw material for the preparation of the boron trifluoride/catalyst complexes which can be used according to the invention, it being possible to employ technical-grade boron trifluoride containing small amounts of sulfur dioxide (purity: 96.5% by weight), but preferably pure boron trifluoride (purity: 99.5% by weight). Boron trifluoride and hydrogen fluoride can be prepared by the processes of B üchner et al.: Industrial Inorganic Chemistry, pages 145 and 137, VCH Verlagsgesellschaft, Weinheim 1989. The alcohols which may be used are base chemicals or can be obtained, for example, by the hydrogenation of the corresponding fatty acids.

Open-chain $C_4$–$C_{10}$-dienes having isolated or conjugated double bonds can be used as dienes in the novel process, for example 1,3-butadiene, isoprene, 1,4-pentadiene, 1,6-hexadiene, 2,5-dimethylhexa-1,5-diene, etc. 1,3-Butadiene and isoprene are particularly preferably used as diene components in the polymerization.

In the novel process, molar isobutene/diene ratios of from 50:1 to 0.4:1, preferably from 20:1 to 1.25:1, in particular from 20:1 to 1:1, may be used in the feed to the reactor. If the diene used is 1,3-butadiene, the content thereof in the feed of the hydrocarbon streams to be polymerized is in general not less than 1% by weight and not more than 55% by weight. The isobutene/diene mixture fed to the reactor may be completely or partially converted into the novel copolymers. In the case of partial conversion of the monomer mixture, for example of 50%, the monomers may serve as solvents, with the result that, if desired, it is possible to dispense with the addition of a further solvent. The addition of solvents which are inert under the reaction conditions, in particular of saturated hydrocarbons, such as butane, pentane, hexane, heptane or octane, or of halohydrocarbons, such as dichloromethane, chloroform, dichoroethane, trichloroethane, tetrachloroethane, perchloroethane or fluorohydrocarbons, to the polymerization mixture is possible. Particularly preferred solvents are straight-chain hydrocarbons. The isobutene content of the polymerization mixture is from 1 to 50, in particular from 1 to 25, % by weight.

Isobutene- and diene-containing hydrocarbon streams, such as those obtained, for example, as $C_4$ or $C_5$ cuts from steam crackers, may advantageously be used as starting materials for the isobutene/diene copolymers. 1,3-Butadiene can be isolated from these $C_4$ cuts by extraction, for example with N-methylpyrrolidone as solvent. Isoprene can be obtained from $C_5$ crack fractions in the same manner. Both 1,3-butadiene and isoprene are base chemicals.

With regard to the total amount of the olefin to be polymerized, isobutene and diene, the boron trifluoride complex catalysts are fed into the polymerization mixture in an amount of from 0.1 to 1.0, advantageously from 0.2 to 0.5, mol %, based on the amount of the boron trifluoride used.

The polymerization of the isobutene with the diene may be carried out batchwise, but the continuous procedure is preferred. For this purpose, the novel process is carried out in a conventional reactor, such as a tube reactor, a tube-bundle reactor or a stirred kettle, preferably in a loop reactor, ie. a tube or tube-bundle reactor with continuous circulation of the reaction mixture, it being possible, as a rule, to vary the ratio of circulation to feed from 10 to 1000 v/v, preferably from 50 to 250 v/v. Of course, after equilibration of the polymerization reaction, the amount of feed is equal to the amount of reaction mixture discharged.

The residence time of the isobutene/diene polymerization mixture in the reactor may be from 10 seconds to 5 hours, preferably from 0.1 to 1 hour, particularly preferably from 0.2 to 0.5 hour. The gross reaction rate is dependent on the amount and on the type of the boron trifluoride complex catalyst used and is advantageously determined in a preliminary experiment for the particular catalyst employed and the isobutene/diene mixture used.

The polymerization is advantageously carried out at below 0° C. Although the isobutene can be polymerized with the diene even at substantially lower temperatures to give the desired isobutene/diene copolymers, the reaction is preferably carried out at from 0° to –60° C., in particular from –2° to –30° C., particularly preferably from –5° to –20° C. In general, the polymerization is effected under atmospheric pressure, but it is also possible to use superatmospheric pressure, in particular the autogenous pressure of the polymerization system. The polymerization is advantageously operated under isothermal conditions and at a constant, steady-state concentration of the individual monomers in the reaction medium.

Since the polymerization reaction is exothermic, the heat of polymerization is, as a rule, removed with the aid of a cooling apparatus, which can be operated, for example, with liquid ammonia as a coolant.

For working up, the discharged reaction mixture is advantageously passed into a medium which deactivates the polymerization catalyst and thus terminates the polymerization reaction. For example, water, alcohols, acetonitrile, ammonia, amines or aqueous solutions of bases, in particular of mineral bases, such as alkali metal or alkaline earth metal hydroxide solutions or solutions of the carbonates of these metals, as well as aqueous ammonia solutions may be used for this purpose.

In the further course of the working up, advantageously after extraction of residual amounts of the catalyst, the copolymer is separated by distillation into unconverted isobutene and diene, any added solvent, oligomers and copolymer. The monomers, oligomers and, where relevant, the solvent can be recycled to the polymerization apparatus and further reacted. The desired isobutene/diene copolymer can be taken off as a bottom product from the distillation column.

The novel process gives chlorine-free, non-drying isobutene/diene copolymers having an average molecular weight of from 500 to 5,000 Dalton and containing more than 60 mol % of terminal double bonds. The copolymers thus obtained are composed of the comonomers isobutene and diene in a molar ratio of 50:1 to 1:1, preferably from 20:1 to 1.25:1, particularly preferably from 10:1 to 2:1. The content of internal double bonds in the copolymers, due to the incorporation of conjugated dienes via a 1,4-addition, may be from 50 to 1,000 mol %. The dispersity of the copolymers is, as a rule, from 1.4 to 2.5, ie. the copolymers obtained are very pure, which in turn has advantages with regard to performance characteristics.

EXAMPLES

The average molecular weights ($M_n$) of the polymers prepared according to the Examples were determined by gel permeation chromatography, standardized polyisobutenes being used for calibration. The number average molecular weight $M_n$ was calculated from the resulting chromatograms using the equation I $$M_n = \frac{\Sigma c_i}{\Sigma \frac{c_i}{M_i}} \qquad \text{I}$$

in which $c_i$ is the concentration of the individual polymer species i in the polymer mixture obtained and $M_i$ is the molecular weight of the individual polymer species i. The molecular weight distribution, referred to below as the dispersity D, was calculated from the ratio of the weight average molecular weight ($M_w$) to the number average molecular weight ($M_n$) using the equation II $$\frac{M_w}{M_n} = D. \qquad \text{II}$$

The weight average molecular weight $M_w$ was determined from the resulting chromatograms with the aid of the formula III $$M_w = \frac{\Sigma c_i M_i}{\Sigma c_i} . \qquad \text{III}$$

The content of terminal double bonds was determined with the aid of $^{13}$C-NMR spectroscopy, deuterated chloroform being used as the solvent and tetramethylsilane as the standard. The total content of double bonds was determined by determining the bromine number according to ASTM D 1159-66. The acid number, determined by titration of the discharged reaction mixture with alcoholic potassium hydroxide solution, is a measure of the content of boron trifluoride and/or hydrogen fluoride in the reaction mixture.

Example 1

In a polymerization apparatus consisting of a circulating pump having a delivery of 30 l/h and a loop comprising a 40 cm long tube having an internal diameter of 10 mm, whose reaction volume was 100 ml, 200 g of isobutene, 50 g of 1,3-butadiene, 250 g of n-hexane, 22 mmol of boron trifluoride, 31 mmol of ethanol and 1 mmol of hydrogen fluoride were fed per hour to the suction side of the pump in the polymerization apparatus. All solvents and reagents had been dried beforehand over molecular sieve 3X. The hydrogen fluoride was fed to the reaction apparatus in solution in the ethanol used. During the polymerization, the polymerization apparatus was thermostated at –22° C. Until initiation of the polymerization, the feed rate for boron trifluoride was increased by 15 mmol/h. After establishing a steady state in the polymerization mixture, the molar boron trifluoride/ethanol ratio was 0.7:1.503 g per hour of the polymerization mixture were discharged from the polymerization apparatus via a discharge line which was arranged before the feed pipe for the reagents, and the polymerization reaction was terminated in the discharge by adding 100 mmol/h of acetonitrile to the polymerization mixture. Under the stated conditions, a temperature of −10° C. was established in the polymerization mixture in the steady state.

After operation for 4 hours under steady-state conditions, the acid number of the mixture discharged from the reactor was determined titrimetrically for the determination of the catalyst content, and the isobutene content of the discharged polymerization mixture was determined by gas chromatography. Thereafter, the discharged polymerization mixture thus obtained was collected for 1 hour (1 hour sample) and stirred with 300 ml of water at 40° C. The wash water was separated off and the 1 hour sample was washed again with 300 ml of water. In the subsequent purification by distillation, unconverted isobutene, 1,3-butadiene, n-hexane and oligomers were separated off from the resulting isobutene/1,3-butadiene copolymer at 220° C., residual amounts of these components were distilled off at 2 mbar and the copolymer was removed from the bottom of the distillation. The copolymer thus obtained was characterized by means of $^{13}$C-NMR spectroscopy, via the determination of its bromine number and with the aid of gel permeation chromatography using a polyisobutylene standard.

In the case of an isobutene conversion of more than 98%, a 1,3-butadiene conversion of 96% and an acid number of 4.0 mg KOH/g of discharged mixture, an isobutene/1,3-butadiene copolymer having an average molecular weight $M_n$ of 967, a dispersity of 1.49 and a content of terminal double bonds of 33%, based on the total amount of 2.8 double bonds/molecule, was obtained, ie. 91% of all copolymer molecules carried a terminal double bond. The bromine number of the copolymer was 44.8, ie. each polymer molecule had on average 2.8 double bonds.

Example 2

Example 2 was carried out by the procedure of Example 1 in the apparatus of Example 1. The feed per hour consisted of 200 g of n-hexane, 200 g of isobutene, 100 g of 1,3-butadiene, 23 mmol of boron trifluoride and 29 mmol of isopropanol. Hydrogen fluoride was not used in this experiment. The temperature of the polymerization mixture was brought to −6° C.

The discharged polymerization mixture had an acid number of 3.5 mg KOH/g, an isobutene content of 3.8% by weight and a 1,3-butadiene content of 6.7% by weight. Working up gave a copolymer having a molecular weight $M_n$ of 930, a dispersity of 1.54, a bromine number of 61.1 and a content of terminal double bonds of 35%, based on the total number of double bonds per molecule. The copolymer obtained thus contained a total of 3.6 double bonds per molecule of which 1.2 double bonds were terminal ones.

Examples 3 to 7

Examples 2 to 5 were carried out similarly to the procedure of Example 1 in the same polymerization apparatus, the reaction conditions shown in Table 1 being used and the starting materials stated there being employed. The hydrogen fluoride was fed to the polymerization apparatus together with the alcohol as a solution of about 3, 10 or 20 mol %. The results of Examples 2 to 5 are listed in Table 1.

TABLE 1

| Example | | 3 | 4 | 5 | 6 | 7 |
|---|---|---|---|---|---|---|
| Isobutene | [g/h] | 200 | 150 | 200 | 200 | 200 |
| n-Hexane | [g/h] | 250 | 200 | 150 | 250 | 250 |
| Diene | | Butadiene | Butadiene | Butadiene | Isoprene | Hexadiene[1] |
| Amount of diene | [g/h] | 50 | 150 | 200 | 50 | 25 |
| $BF_3$ | [mmol/h] | 20 | 21 | 18 | 17 | 19 |
| n-Propanol | [mmol/h] | 32 | 25 | 25 | 33 | 35 |
| HF | [mmol/h] | 1.0 | 2.8 | 5.0 | 1.0 | 1.2 |
| Reactor temperature | [°C.] | −8 | −6 | −2 | −8 | −9 |
| Acid number | | 4.0 | 3.6 | 3.6 | 3.8 | 3.7 |
| Isobutene content | [% by wt.] | 1.6 | 2.8 | 3.1 | 1.4 | 4.2 |
| Butadiene content | [% by wt.] | 1.1 | 5.6 | 4.9 | 4.3 | 4.5 |
| Bromine number | | 62.0 | 73.8 | 73.3 | 50.4 | 31.3 |
| Terminal double bonds[2] | [%] | 18 | 12 | 22 | 24 | 43 |
| Terminal double bonds/mol | [%] | 68 | 74 | 157 | 82 | 86 |
| Double bonds/molecule | | 3.9 | 6.4 | 6.8 | 3.4 | 2.0 |
| $M_n^{GPC}$ | | 1017 | 1381 | 1474 | 1073 | 1044 |
| Distribution $D^{GPC}$ | | 1.47 | 1.83 | 1.84 | 1.51 | 1.48 |

[1] 2,5-Dimethylhexa-1,5-diene
[2] Based on the total number of double bonds
GPC Gel permeation chromatography

Example 8

Example 8 was carried out similarly to Example 1. A $C_4$ cut from a steam cracker was used as a starting material, said cut having the following composition:

| | |
|---|---|
| 1,3-Butadiene | 52% by weight |
| Isobutane | 1.9% by weight |
| n-Butane | 4.4% by weight |
| But-1-ene | 13.9% by weight |
| trans-But-2-ene | 3.7% by weight |
| cis-But-2-ene | 2.2% by weight |
| Isobutene | 21.8% by weight |

The reaction conditions and results are shown in Table 2.

TABLE 2

| n-Hexane | [g/h] | 200 |
|---|---|---|
| $C_4$ cut | [g/h] | 500 |
| $BF_3$ | [mmol/h] | 22 |
| n-Propanol | [mmol/h] | 23 |
| HF | [mmol/h] | 0.7 |
| Reactor temperature | [°C.] | −10 |
| Acid number | | 3.6 |
| Isobutene content in the discharge | [% by weight] | 2.2 |
| Butadiene content in the discharge | [% by weight] | 35 |
| Bromine number | | 79.6 |
| Terminal double bonds[1] | [%] | 14 |
| Terminal double bonds/mol | [%] | 70 |
| Double bonds molecule | | 5.0 |

TABLE 2-continued

| | |
|---|---|
| $M_n^{GPC}$ | 1004 |
| Distribution $D^{GPC}$ | 1.55 |

[1] Based on the total number of double bonds

Example 9

Example 9 was carried out similarly to Example 1. The diene source used was a $C_5$ cut from a steam cracker, which had the following composition:

| | |
|---|---|
| Pentanes | 30.4% by weight |
| n-Pentenes | 6.1% by weight |
| Methylbutene | 7.9% by weight |
| Pentadienes | 13.4% by weight |
| Isoprene | 18.7% by weight |
| Cyclopentanes/cyclopentenes | 4.5% by weight |
| Cyclopentadiene | 18.4% by weight |
| Others | 0.6% by weight |

The reaction conditions and results are summarized in Table 3:

TABLE 3

| | | |
|---|---|---|
| n-Hexane | [g/h] | 200 |
| $C_5$ cut | [g/h] | 150 |
| Isobutene | [g/h] | 150 |
| $BF_3$ | [mmol/h] | 29 |
| Isopropanol | [mmol/h] | 44 |
| Reactor temperature | [°C.] | −10 |
| Acid number | | 4.0 |
| Isobutene content | [% by weight] | <1 |
| Bromine number | | 24.4 |
| Terminal double bonds[1] | [%] | 48 |
| Terminal double bonds/mol | [%] | 77 |
| Double bonds/molecule | | 1.6 |
| $M_n^{GPC}$ | | 1045 |
| Distribution $D^{GPC}$ | | 1.72 |

We claim:

1. A chlorine-free, non-drying copolymer of isobutene and a $C_4$–$C_{10}$-diene having isolated or conjugated double bonds and containing at least 60 mol % of terminal double bonds and having a molecular weight $M_n$ of from 500 to 5,000 Dalton.

2. A copolymer as claimed in claim 1, which is composed of isobutene and a diene comonomer in a molar isobutene/diene ratio of from 50:1 to 1:1.

3. A process for the preparation of a chlorine-free, non-drying copolymer from one $C_4$–$C_{10}$-diene or different $C_4$–$C_{10}$-dienes having conjugated or isolated double bonds and isobutene, whose average molecular weight is from 500 to 5,000 Dalton and which contains at least 60 mol % of terminal double bonds, by cationic polymerization, wherein the isobutene is polymerized with the diene in a molar isobutene/diene ratio of from 50:1 to 0.4:1 with the aid of a boron trifluoride/$C_1$–$C_{15}$-alcohol complex whose molar boron trifluoride/alcohol ratio is from 0.25 to 0.9, in the presence or absence of hydrogen fluoride at from −60° to 0° C.

4. A process as claimed in claim 3, wherein hydrogen fluoride is added in a molar ratio of from 0.001 to 0.5, based on the boron contained in the polymerization mixture, to the polymerization mixture.

5. A process as claimed in claim 3, wherein a molar isobutene/diene ratio of from 20:1 to 1:1 is established in the polymerization mixture.

6. A process as claimed in claim 3, wherein 1,3-butadiene or isoprene is used as the diene.

7. A process as claimed in claim 3, wherein isobutene- and diene-containing hydrocarbon streams are used in the polymerization.

8. A copolymer as claimed in claim 1, which contains 1,3-butadiene isoprene as the diene comonomer.

9. A copolymer as claimed in claim 1, which is composed of isobutene and a diene comonomer in a molar ratio of isobutene:diene of from 50:1 to 1:1 and which contains 1,3-butadiene or isoprene as the diene comonomer.

* * * * *